(12) United States Patent
Moser et al.

(10) Patent No.: US 7,958,955 B2
(45) Date of Patent: Jun. 14, 2011

(54) AUTOMOTIVE INSPECTION DEVICE

(75) Inventors: Roland Moser, Zurich (CH); Wolfgang Fischer, Zurich (CH); Fabien Tache, Zurich (CH); Roland Yves Siegwart, Schwyz (CH); Francesco Mondada, Bussigny (CH)

(73) Assignee: Alstom Technology Ltd, Baden (CH)

( * ) Notice: Subject to any disclaimer, the term of this patent is extended or adjusted under 35 U.S.C. 154(b) by 133 days.

(21) Appl. No.: 12/155,748

(22) Filed: Jun. 9, 2008

(65) Prior Publication Data
US 2008/0308326 A1 Dec. 18, 2008

(30) Foreign Application Priority Data

Jun. 14, 2007 (EP) .................................... 07110243

(51) Int. Cl.
*B62D 51/06* (2006.01)
(52) U.S. Cl. ............ 180/8.3; 180/8.1; 180/8.2; 180/8.5; 180/9.3; 180/9.32; 180/9.34
(58) Field of Classification Search .................. 180/8.3, 180/8.1, 8.2, 8.5, 9.3, 9.32, 9.34
See application file for complete search history.

(56) References Cited

U.S. PATENT DOCUMENTS

| | | | | |
|---|---|---|---|---|
| 3,690,393 | A * | 9/1972 | Guy .............................. | 180/65.6 |
| 4,828,059 | A | 5/1989 | Naito et al. | |
| 5,121,805 | A * | 6/1992 | Collie ............................ | 180/8.1 |
| 5,220,869 | A * | 6/1993 | Pelrine et al. ..................... | 105/78 |
| 5,366,038 | A * | 11/1994 | Hidetsugu et al. ............ | 180/164 |
| 5,435,405 | A * | 7/1995 | Schempf et al. ............... | 180/9.1 |
| 5,894,901 | A * | 4/1999 | Awamura et al. ............ | 180/9.54 |
| 6,267,196 | B1 * | 7/2001 | Wilcox et al. .................. | 180/347 |
| 6,662,889 | B2 * | 12/2003 | De Fazio et al. ................ | 180/22 |
| 7,233,221 | B2 * | 6/2007 | Reboredo Losada et al. | 335/302 |
| 7,597,162 | B2 * | 10/2009 | Won .............................. | 180/9.32 |
| 7,600,592 | B2 * | 10/2009 | Goldenberg et al. .......... | 180/9.1 |
| 2004/0020002 | A1 | 2/2004 | Moore et al. | |

FOREIGN PATENT DOCUMENTS

EP 0 526 900 A 2/1993

OTHER PUBLICATIONS

European Search Report dated Nov. 5, 2007 issued in corresponding European Patent Application No. 07110243.8.

* cited by examiner

*Primary Examiner* — Paul N Dickson
*Assistant Examiner* — Marlon A Arce
(74) *Attorney, Agent, or Firm* — Buchanan Ingersoll & Rooney PC

(57) ABSTRACT

An automotive device for the inspection of internal spaces having ferromagnetic surfaces includes at least two magnetic wheels (3) or caterpillars, or at least two magnetic legs for the advancement of the device along the surfaces to be inspected. According to the invention, the device includes actively powered rotating arms (1) attached to a wheel (3), caterpillar, or leg of the device. Each rotating arm (1) has a length longer than the shortest distance between the point of attachment of the rotating arm to the device and the surface. When the device is in a position, where there is magnetic contact to the surface in two or more points and the device is no longer able to advance due to the strength of the magnetic forces, the rotating arms are brought into non-magnetic contact with the surface in order to create an air gap between the surface and the magnetic wheel and thus reduce the magnetic forces. The device is thereby enabled to overcome the magnetic forces and advance the device along the surface.

14 Claims, 6 Drawing Sheets

AUTOMOTIVE INSPECTION DEVICE

TECHNICAL FIELD

The invention pertains to an automotive device for inspection of surfaces, in particular of internal spaces having ferromagnetic surfaces.

BACKGROUND ART

Devices used for the inspection of internal spaces are configured to move automotively, without the aid of movement from another source or human being. They contain actuators or motors for the movement of wheels, legs, or caterpillars, which advance the device along a surface. In order to allow the inspection of the entire internal space the devices are equipped such that they can remain in contact with all surfaces, including sidewall and ceiling surfaces. In the case of ferromagnetic surfaces as for example in machines, turbines, or motors, such devices are equipped with permanent magnets or electromagnets incorporated into the legs, wheels, or caterpillars. The magnets allow movement of the inspection device along very steep or vertical walls as well as when it is upside down.

Automotive devices for inspection of internal spaces are dimensioned according to the size of an opening provided to enter the internal space to be inspected. In particular, the size of legs, caterpillar or diameter of wheels and the motor for advancing the device are limited according to the opening. The devices are accordingly suitable for the inspection of flat and convex surfaces as well as surfaces having concave contours that are large compared to the size of the legs, wheels, or caterpillars. If the contour of the surface however, is more complex and includes piping, steps, holes, or grooves, as for example in steam turbine parts such as steam chests, then advancing a device along the surfaces becomes more complex. In particular, when concave contours are smaller than the size of the wheels or caterpillars, the device is no longer able to advance as illustrated for example in FIG. 1. FIG. 1 shows wheels of an inspection device equipped with wheels 3 with magnets providing contact with a ferromagnetic surface 4 at all times. The wheels 3 of the device have reached a concave step of the surface 4, where the step height is smaller than the wheel diameter. The wheel is in contact at two points of the surface, the magnetic forces acting at both points. The motor is not strong enough to overcome the magnetic forces and cannot advance the device any further along the surface.

SUMMARY OF INVENTION

It is an object of the invention to provide an automotive device for inspection of internal spaces having ferromagnetic surfaces where the device is able to advance along the surfaces by means of wheels, caterpillars, or legs having magnets in contact with the surfaces. The device shall in particular be able to advance over contours of all sizes and shapes including concave surfaces with step sizes or radius of curvatures smaller than the size of the wheel, caterpillar, or leg of the automotive device.

An automotive device for the inspection of internal spaces having ferromagnetic surfaces includes at least two magnetic wheels or caterpillars, or at least two magnetic legs for the advancement of the device along the surfaces to be inspected. According to the invention, the device includes additionally actively powered rotating arms attached to at least one of the wheels, caterpillars, or legs of the device. Each rotating arm has a length that is longer than the shortest distance between the location of the rotation axis of the rotating arm at the device and the ferromagnetic surface.

When the device is in a position of the type as shown in FIG. 1 and 3a and its motor cannot overcome the magnetic forces keeping the device in contact with the surfaces, the rotating arms are brought into a position in the direction of the ferromagnetic surface as shown in FIG. 3b. Due to the length of the rotating arms, a non-magnetic contact between the device and the surface is achieved and pressure forces are created against the surface at one or more contact points on at least one of the wheels or caterpillars, or legs. No magnetic forces act on these contact points created by the rotating arms. The pressure forces lift up the wheel or caterpillar, or leg, whereby an air gap between the surface and the wheel, caterpillar, or leg is formed. By means of the rotating arms, the magnetic force on the wheels or caterpillar at a specific point are reduced. The motor of the device then overcomes the magnetic force and can again advance the device along the surface. Once the device is able to advance again, the rotating arms are brought into a position away from the surfaces such that they do not make any contact and the magnetic forces can act in full.

By means of the rotating arms on both sides of the wheels, caterpillars or legs, the device is more stabilized against tilting in a direction at an angle to the direction of advancement.

In an embodiment of the invention, the rotation axis of the actively powered rotating arms is coaxial with the axis of the device's wheels or caterpillars, or is placed at the level of the leg. This allows most universal and symmetric movement of the device in all directions.

In a further embodiment of the invention, the rotating arms include a non-magnetic wheel or ball attached, which make contact with the surface to be inspected when the rotating arm is rotated to point in the direction of the surface. This measure allows reduced friction at the contact points and thereby higher precision of the movement of the device. This in turn allows the use of a smaller actuator for the device.

In a further embodiment of the device, the device includes only two wheels, for example arranged in the manner of two bicycle wheels in line with the direction of advancing the device. The distance between the two non-magnetic contact points of the rotating arms with the surface are dimensioned such that the device is stabilized against tilting in a direction at an angle to the direction of advancement of the device. For this, the distance between the non-magnetic contact points shall in suitable manner be as large as possible.

In a further embodiment of the invention, the device includes at least two wheels for the advancement of the device and the actuator for the actively powered rotating arm and the actuator for the turning of the wheels are arranged parallel to the wheel axis and above the wheel, i.e. on the side of the wheel away from the surface. This configuration allows an overall size of the device having minimized width.

In a particular embodiment of the above embodiment the device includes spur gears and/or gear belts for the transmission of the power to the wheels and rotating arms.

The invention is suitable for devices having for advancement of the device either wheels or caterpillars or legs. It is also suitable for devices having wheels or caterpillars and, additionally, legs for advancement.

The device for inspection according to the invention can be equipped with inspection devices such as vision systems and sensing systems such as ultrasonic, eddy-current and x-ray devices.

BEST MODES FOR CARRYING OUT THE INVENTION

Figure 2:
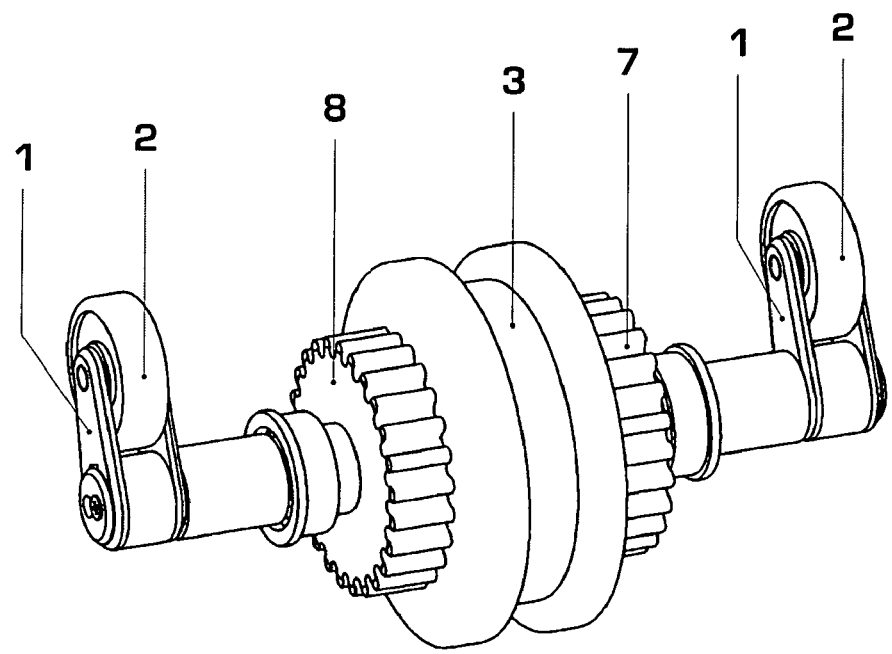
FIG. 2 shows a perspective view of the wheel for advancement of a device for the inspection of surfaces of an internal space and the rotating arms according to an exemplary embodiment of the invention on both sides of the wheel.

FIG. 2 shows a wheel 3 for advancement of the device for inspection according to the invention, and in particular the actively powered rotating arms 1 and wheels 2 for achieving non-magnetic contact with the surface. The rotating arms 1 rotate about the shaft coaxial with the rotating axis of the wheel 3. A dented wheel 7 connects the wheel 3 to its gear and actuator or motor (not shown). A dented wheel 8 drives the shaft that turns the rotating arms 1.

Figure 3A:
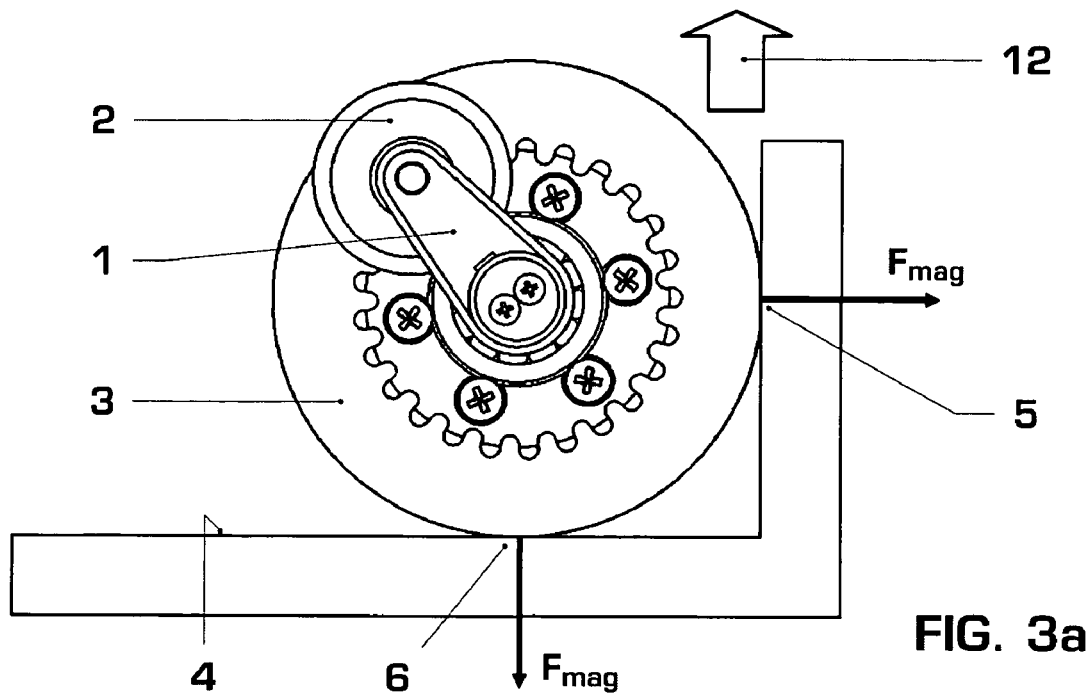
FIG. 3a shows a side view of an exemplary embodiment of the wheel for advancement of a device for inspection having a rotating arm in a position not in contact with the surface.
Figure 3B:
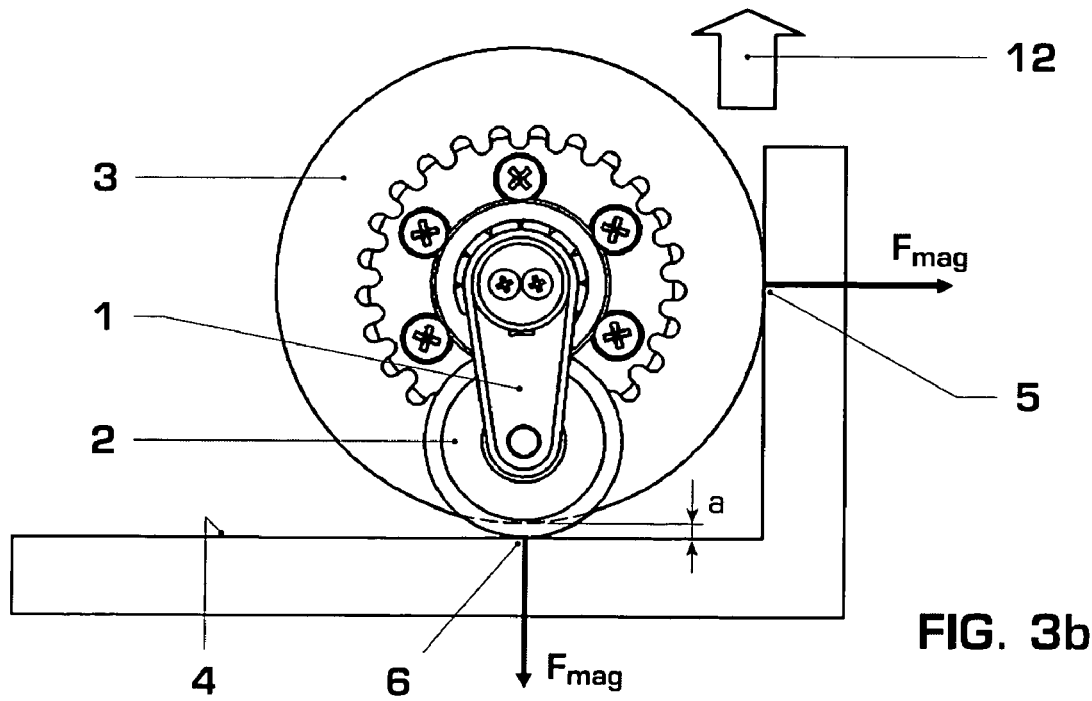
FIG. 3b shows the same view as in FIG. 3a with the rotating arm in contact with the surface.

FIG. 3a and b show two different positions of the rotating arms 1 respectively. FIG. 3a shows the non-magnetic wheel 2 of the rotating arm 1 in a position away from a ferro-magnetic surface 4. The wheel 3 is in contact at points 5 and 6 by magnetic forces $F_{mag}$ with a sidewall surface and a horizontal surface 4, respectively. FIG. 3b shows the rotating arm in a position providing non-magnetic contact by means of the wheel 2 with the surface 4. In the device shown, the rotation axis of the rotating arm coincides with the axis of rotation of the wheel 3. The rotating arm 1 including the non-magnetic wheel 2 has a length considered from the axis of rotation of the rotating arm on the device along a straight line to its end at the circumference of the wheel 2; this length is greater than the distance extending from the axis of rotation of the arm at the device along a straight line to the circumference of the magnetic wheel 3. The rotating arm with the wheel 2 when positioned in the direction point 6 of the surface 4, lifts the wheel 3 away from surface 4 by a distance "a", creating an air gap such that the magnetic force $F_{mag}$ at point 6 is reduced. The motor of the device is then able to overcome the remaining magnetic force and move the device in the direction indicated by the arrow 12. The device remains in contact with the sidewall at point 5 by means of the magnetic force on the wheel 3 in direct contact with the sidewall surface.

Figure 4:
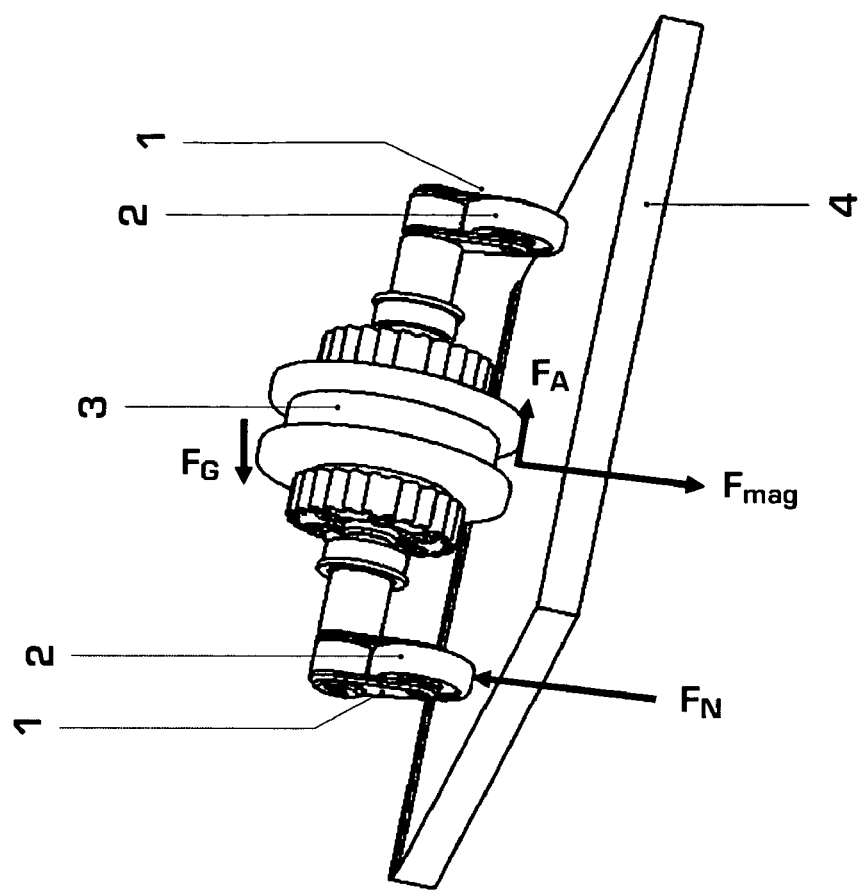
FIG. 4 shows the device according to an exemplary embodiment of the invention stabilized against tilt by the rotating arms.

FIG. 4 shows the device for inspection of surfaces on a tilted surface, where the device could fall on its side in spite of the magnetic force $F_{mag}$. The rotating arms 1 are in a position such that the wheels 2 are in contact with the tilted surface, thus preventing a tilt of the device. In order to assure optimal stability the distance between the wheel 3 and the wheels 2 is chosen as large as suitably possible.

Figure 5:
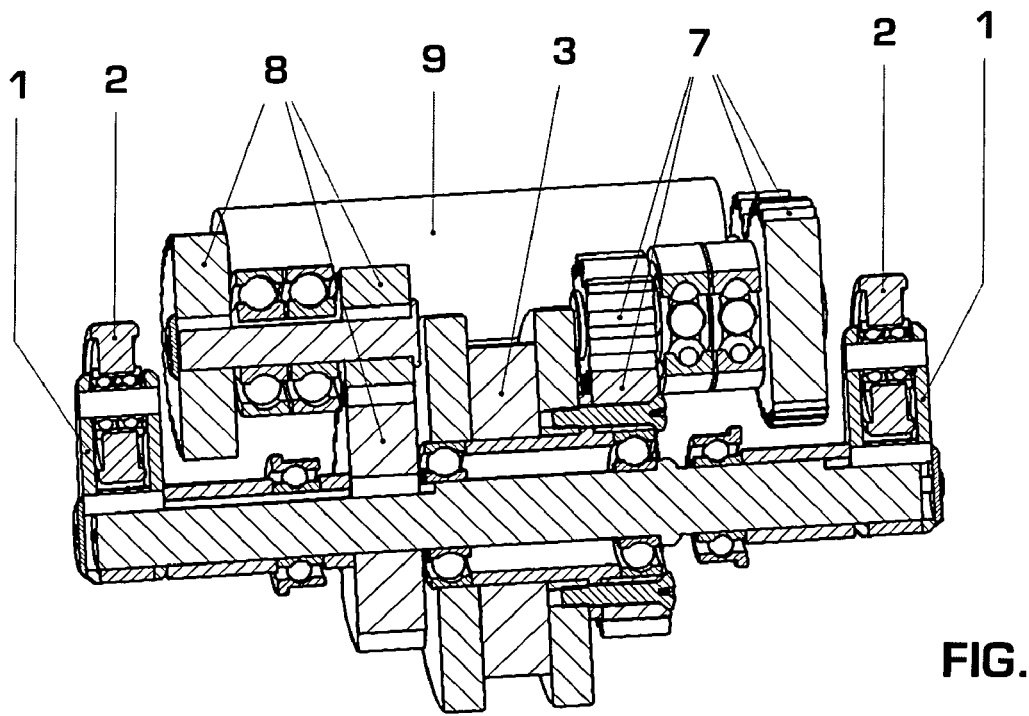
FIG. 5 shows the device according to an exemplary embodiment of the invention in a partially cut open view showing in particular the mechanism for turning the wheels.

FIG. 5 shows the device according to the invention and in particular the arrangement of actuators 9 for the wheel 3 for the rotating arms 1 with contact wheels 2 and for the wheel 3 for the advancement of the device. Gears 7 and 8, for example spur gears, are arranged for the transmission of power from the actuators 9 to the wheels and rotating arms.

Figure 6:
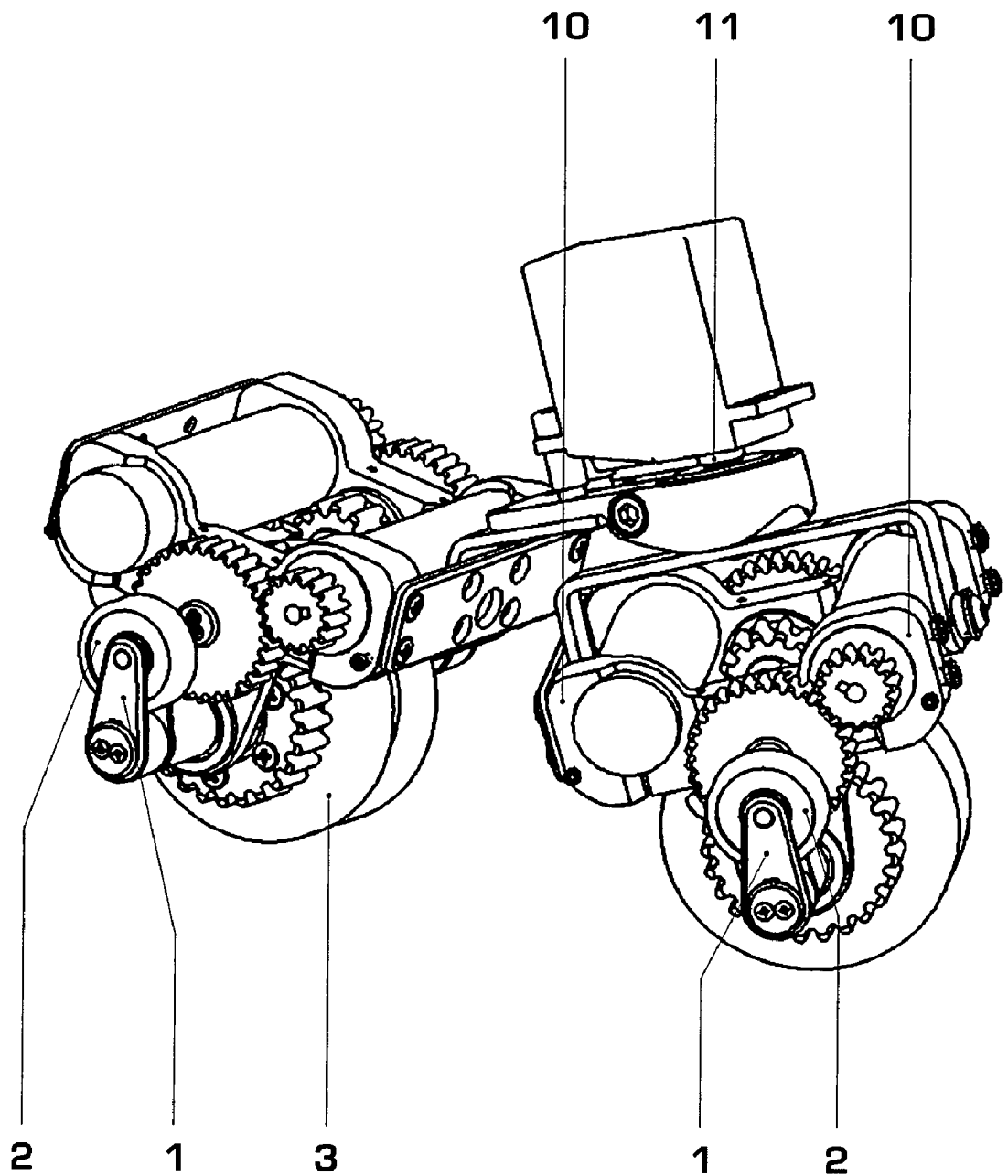
FIG. 6 shows a perspective view of the device according to an exemplary embodiment of the invention having two wheels, including a mechanism for steering of one wheel.

FIG. 6 shows the device for inspection of surfaces having two wheels 3 for advancing the device, each equipped with rotating arms 1 with contact wheels 2 for reducing the magnetic force at selected contact points with the surfaces. Actuators 9 are arranged above each wheel 3. A mechanism 11 for steering with one degree of freedom is connected to the axis of the wheel 3 for advancing the device. In an optional embodiment of the device, the steered wheel 3 includes a mechanism 10 for suspension of the wheel 3.

Figure 7A:
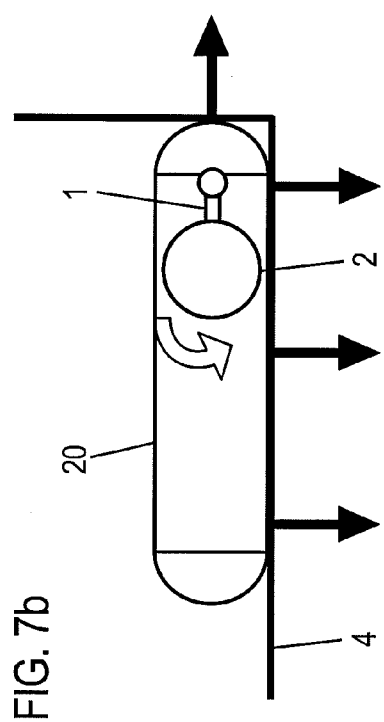
FIGS. 7a-7d show a schematics of an exemplary embodiment of the invention including caterpillar tracks.
Figure 7B:
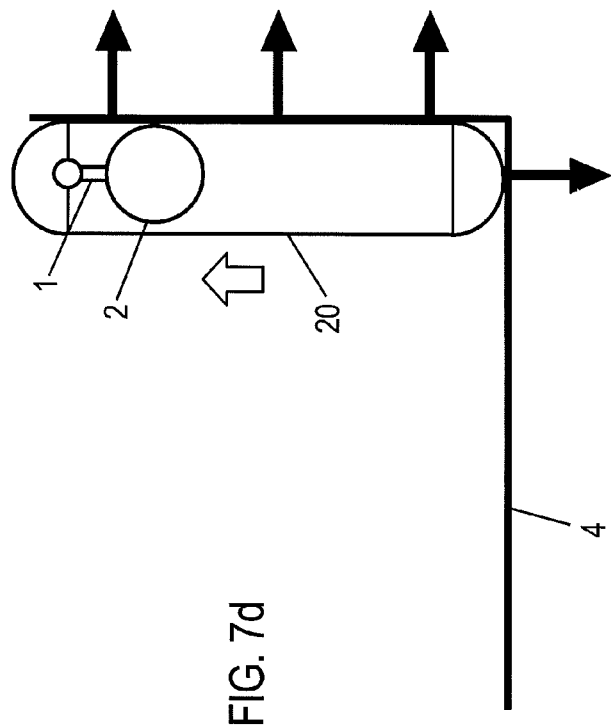
Figure 7C:
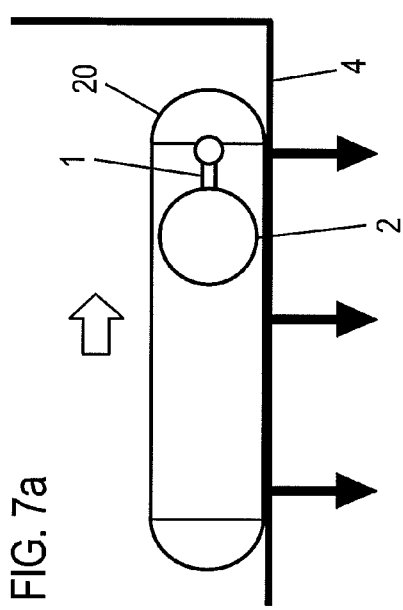
Figure 7D:
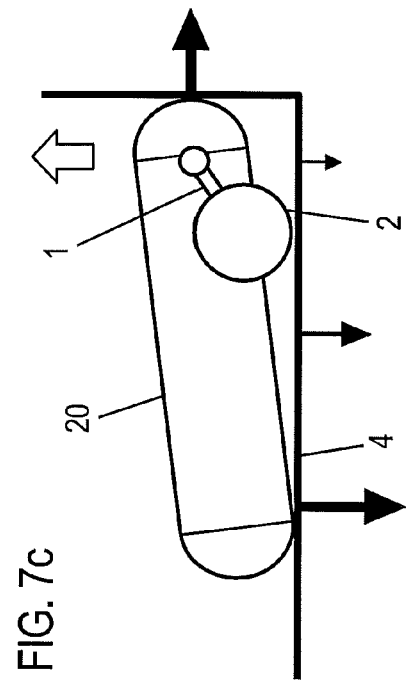
Figure 8A:
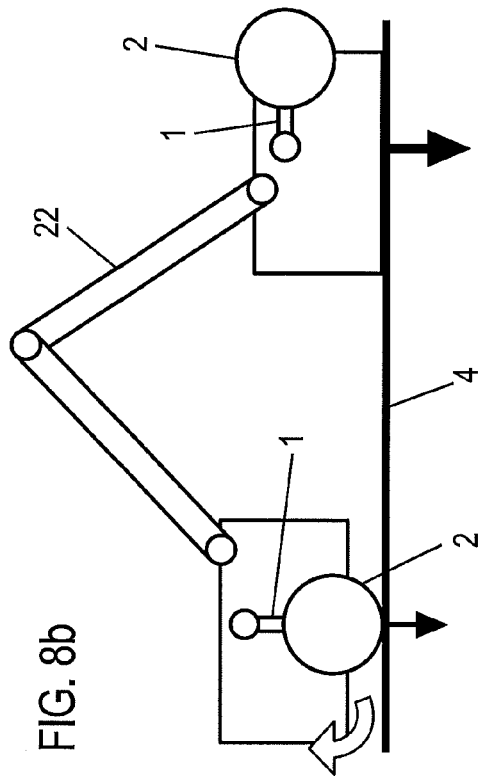
FIGS. 8a-8d show schematics of an exemplary embodiment of the invention including legs.
Figure 8B:
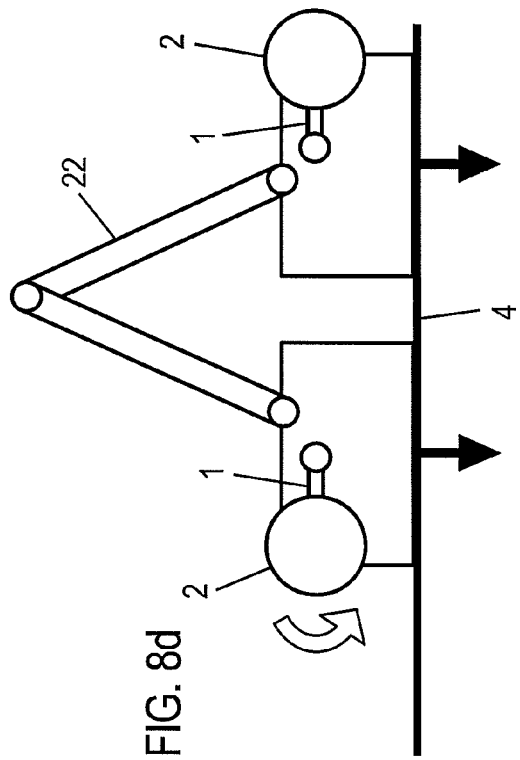
Figure 8C:
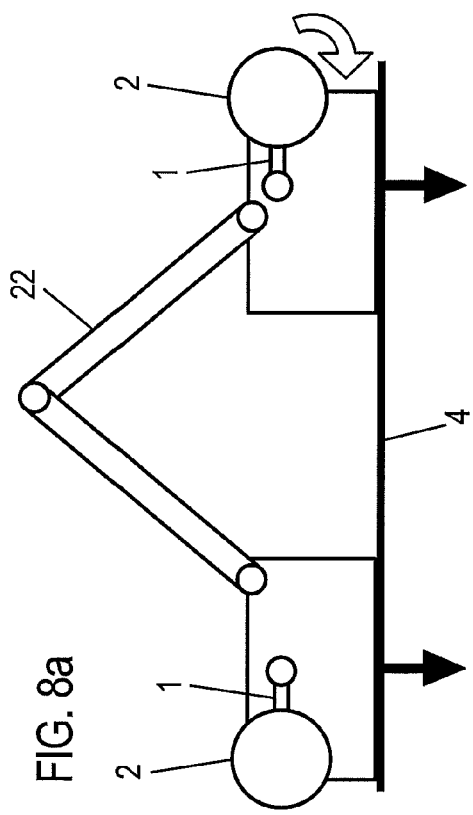
Figure 8D:
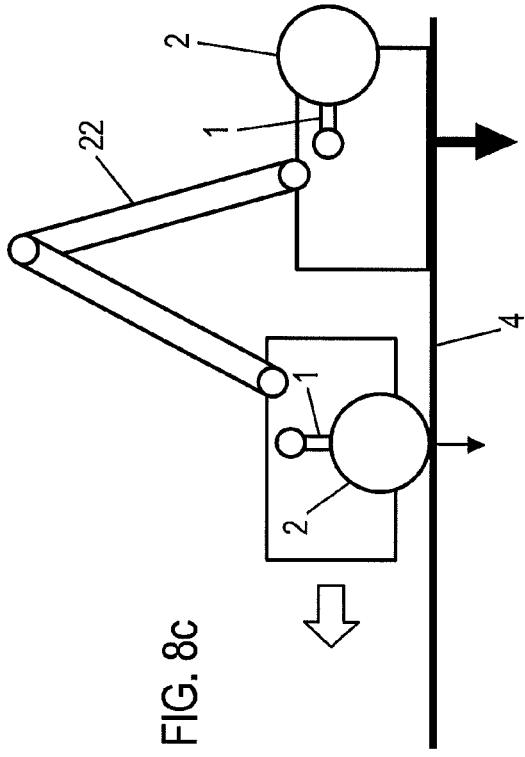

FIG. 7a-7b show the device for inspection of surfaces having caterpillar tracks 20 for advancing the device, each equipped with rotating arms 1 with contact wheels 2 for reducing the magnetic force at selected contact points with surfaces.

FIGS. 8a-8d show the device for inspection of surfaces having two legs 22 for advancing the device, each equipped with rotating arms with contact wheels 2 for reducing the magnetic force at selected contact points with the surfaces.

Figure 1:
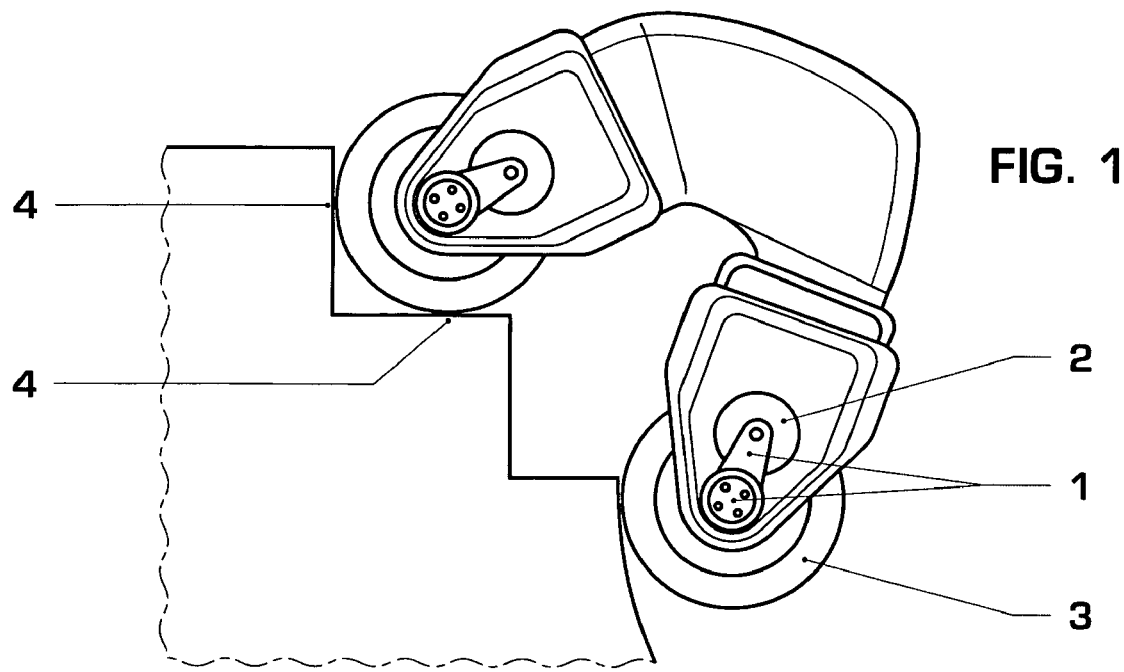
FIG. 1 shows a known device for the inspection of surfaces having wheels smaller than the size of a step to overcome.

Terms used in Figures 1 actively powered rotating arms
2 wheel for non-magnetic contact
3 wheel for advancing the device for inspection
4 surface
5,6 contact points on surface
7, 8 spur gears
9 actuator for wheel for advancing the device and for powering the rotating the arms
10 suspension system for wheel
11 steering system for wheel
12 direction of advancing the device

The invention claimed is:

1. An automotive device for the inspection of spaces having ferromagnetic surfaces comprising:
    at least two magnetic contact locomotion devices that allow movement of the automotive device along the spaces wherein
    the device includes actively powered rotating arms attached to at least one of the contact locomotion devices, where each rotating arm has a length from its rotation axis to its end that is longer than a shortest distance between the rotation axis of the rotating arm at the device and the ferromagnetic surface, and the rotating arm, when directed toward the surface, being in non-magnetic contact with the surface and there is an air gap between the surface and at least one contact locomotion device, the air gap having a distance in which the magnetic force between the at least one contact locomotion device, and the ferromagnetic forces are reduced to a level that the at least one contact locomotion device is able to move along the spaces.

2. An automotive device according to claim 1, wherein the rotation axis of the actively powered rotating arms is coaxial with an axis of the device's contact locomotion devices.

3. An automotive device according to claim 1, wherein the rotating arms each include a non-magnetic contact wheel or non-magnetic contact ball arranged at the end of the rotating arms.

4. An automotive device according to claim 1, wherein an actuator for the actively powered rotating arms and an actuator for moving the contact locomotion devices are arranged parallel to and above a rotation axis of the contact locomotion devices.

5. An automotive device according to claim 3, wherein one of the contact locomotion devices includes a steering mechanism.

6. An automotive device according to claim 5, wherein one of the contact locomotion devices includes a passive suspension system.

7. An automotive device according to claim 2, wherein the rotating arms each include a non-magnetic contact wheel or non-magnetic contact ball arranged at the end of the rotating arms.

8. An automotive device according to claim 2, wherein an actuator for the actively powered rotating arms and an actuator for moving the contact locomotion devices are arranged parallel to and above the rotation axis of the contact locomotion devices.

9. An automotive device according to claim 3, wherein an actuator for the actively powered rotating arms and an actuator for moving the contact locomotion devices are arranged parallel to and above the rotation axis of the contact locomotion devices.

10. An automotive device according to claim 4, wherein one of the contact locomotion devices includes a steering mechanism.

11. The automotive device according to claim 1, wherein the contact locomotion devices are wheels.

12. The automotive device according to claim 1, wherein the contact locomotion devices are caterpillar tracks.

13. The automotive device according to claim 1, wherein the contact locomotion devices are legs.

14. An automotive device for the inspection of spaces having ferromagnetic surfaces, comprising:
  at least two magnetic contact locomotion devices that allow movement of the automotive device along the spaces wherein
  the device includes actively powered rotating arms attached to at least one of the contact locomotion devices, where each rotating arm has a length from its rotation axis to its end that is longer than a shortest distance between the rotation axis of the rotating arm at the device and the ferromagnetic surface, and the rotating arm, when directed toward the surface, being in non-magnetic contact with the surface and there is an air gap between the surface and at least one contact locomotion device, and when directed away from the surface, the rotating arm not being in contact with the surface.

* * * * *